(12) United States Patent
Ochiai et al.

(10) Patent No.: US 12,072,130 B2
(45) Date of Patent: Aug. 27, 2024

(54) REFRIGERATION CYCLE APPARATUS

(71) Applicant: Mitsubishi Electric Corporation, Tokyo (JP)

(72) Inventors: Yasutaka Ochiai, Tokyo (JP); Nobuaki Tasaki, Tokyo (JP); Fuyuki Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 17/774,586

(22) PCT Filed: May 22, 2020

(86) PCT No.: PCT/JP2020/020216
§ 371 (c)(1),
(2) Date: May 5, 2022

(87) PCT Pub. No.: WO2021/145007
PCT Pub. Date: Jul. 22, 2021

(65) Prior Publication Data
US 2022/0397320 A1 Dec. 15, 2022

(30) Foreign Application Priority Data
Jan. 14, 2020 (JP) ................. 2020-003652

(51) Int. Cl.
*F25B 49/02* (2006.01)
*F25B 5/02* (2006.01)
(Continued)

(52) U.S. Cl.
CPC ............. *F25B 49/02* (2013.01); *F25B 5/02* (2013.01); *F25B 40/02* (2013.01); *F25B 40/06* (2013.01);
(Continued)

(58) Field of Classification Search
CPC .. F25B 49/02; F25B 5/02; F25B 40/02; F25B 40/06; F25B 2600/2501; F25B 2700/2103;
(Continued)

(56) References Cited

U.S. PATENT DOCUMENTS 5,214,918 A 6/1993 Oguni et al.
5,465,588 A * 11/1995 McCahill ................ F24D 15/04
62/238.7

(Continued)

FOREIGN PATENT DOCUMENTS

EP 3361190 A1 8/2018
JP 2-28707 * 11/1990
(Continued)

OTHER PUBLICATIONS

International Search Report of the International Searching Authority dated Aug. 4, 2020 issued in corresponding International Application No. PCT/JP2020/020216 (and English translation).
(Continued)

*Primary Examiner* — Henry T Crenshaw
(74) *Attorney, Agent, or Firm* — Posz Law Group, PLC

(57) ABSTRACT

A refrigeration cycle apparatus includes a refrigeration cycle circuit that has a compressor, a condenser, an expansion device, and an evaporator that are connected through a pipe, the refrigeration cycle circuit being configured to allow refrigerant to circulate in the refrigeration cycle circuit, and a controller configured to determine whether the refrigerant leaks or whether the expansion device malfunctions on the basis of a degree of subcooling at an outlet of the condenser and a degree of superheat at an outlet of the evaporator or a degree of superheat at a suction port of the compressor.

16 Claims, 10 Drawing Sheets

(51) Int. Cl.
*F25B 40/02* (2006.01)
*F25B 40/06* (2006.01)

(52) U.S. Cl.
CPC ..... *F25B 2500/08* (2013.01); *F25B 2500/222* (2013.01); *F25B 2600/2501* (2013.01); *F25B 2700/2103* (2013.01)

(58) Field of Classification Search
CPC .......... F25B 2400/0411; F25B 2500/08; F25B 2500/222; F25B 2700/21151; F25B 2700/21163; F25B 2700/21175
See application file for complete search history.

(56) References Cited

U.S. PATENT DOCUMENTS

2016/0109170 A1* 4/2016 Schrey ................ F25B 49/005
62/126
2020/0318877 A1 10/2020 Nakajima et al.

FOREIGN PATENT DOCUMENTS

| JP | H02-287071 A | 11/1990 |
| JP | H03-186170 A | 8/1991 |
| JP | 2017-125654 A | 7/2017 |
| WO | WO 2019-102538 * | 5/2017 |
| WO | 2019/102538 A1 | 11/2017 |

OTHER PUBLICATIONS

Office Action dated Jul. 28, 2020 issued in corresponding Japanese Application No. 2020-003652 (and English machine translation).

* cited by examiner

REFRIGERATION CYCLE APPARATUS

CROSS REFERENCE TO RELATED APPLICATIONS

This application is a U.S. national stage application of PCT/JP2020/020216 filed on May 22, 2020, which claims priority to Japanese patent application no. 2020-003652, filed on Jan. 14, 2020, the contents of which are incorporated herein by reference.

TECHNICAL FIELD

The present disclosure relates to a refrigeration cycle apparatus including a refrigeration cycle circuit.

BACKGROUND ART

Some method for determining an excess or a shortage in the amount of refrigerant in a refrigeration cycle circuit of an air-conditioning apparatus is known (for example, see Patent Literature 1).

A determination method described in Patent Literature 1 is a method in which an excess or a shortage in the amount of refrigerant in a refrigeration cycle circuit is determined by practically considering a change in the amount of refrigerant in the refrigeration cycle circuit as a change in the amount of refrigerant in a condenser. In particular, the degree of subcooling has a strong correlation to the amount of liquid refrigerant staying in a pipe inside the condenser and is thus an important indicator for determining the amount of refrigerant. In a case where the amount of refrigerant in the refrigeration cycle circuit is insufficient, the degree of subcooling decreases. Thus, to make this determination, the degree of subcooling at an outlet of the condenser is used. By use of this determination method, in a case where the magnitude of the degree of subcooling is less than or equal to a preset threshold, it is determined that a refrigerant leak has occurred.

CITATION LIST

Patent Literature

Patent Literature 1: Japanese Unexamined Patent Application Publication No. H03-186170

SUMMARY OF INVENTION

Technical Problem

The degree of subcooling may decrease in an open lock state in which an expansion device included in the refrigeration cycle circuit is kept open and fails. In a case where whether refrigerant is leaking is determined by use of the determination method described in Patent Literature 1, whether refrigerant is leaking is determined on the basis of the degree of subcooling at the outlet of the condenser. Thus, there is a problem in that an expansion device malfunction in which the expansion device is in the open lock state is erroneously determined to be a refrigerant leak although refrigerant is not actually leaking.

The present disclosure has been made to solve a problem as described above, and an object of the present disclosure is to provide a refrigeration cycle apparatus capable of preventing an erroneous determination that refrigerant is leaking from being made.

Solution to Problem

A refrigeration cycle apparatus according to an embodiment of the present disclosure includes a refrigeration cycle circuit that has a compressor, a condenser, an expansion device, and an evaporator that are connected through a pipe, the refrigeration cycle circuit being configured to allow refrigerant to circulate in the refrigeration cycle circuit, and a controller configured to determine whether the refrigerant leaks or whether the expansion device malfunctions on the basis of a degree of subcooling at an outlet of the condenser and a degree of superheat at an outlet of the evaporator or a degree of superheat at a suction port of the compressor.

Advantageous Effects of Invention

With a refrigeration cycle apparatus according to an embodiment of the present disclosure, whether refrigerant leaks or whether an expansion device malfunctions is determined on the basis of the degree of subcooling at an outlet of a condenser and the degree of superheat at an outlet of an evaporator or the degree of superheat at a suction port of a compressor. In this manner, whether a malfunction has occurred is determined on the basis of the degree of subcooling at the outlet of the condenser. In a case where it is determined that a malfunction has occurred, which one of a refrigerant leak and an expansion device malfunction has occurred is determined on the basis of the degree of superheat at the outlet of the evaporator or the degree of superheat at the suction port of the compressor. Thus, an erroneous determination that refrigerant is leaking is prevented from being made.

DESCRIPTION OF EMBODIMENTS

Figure 1:
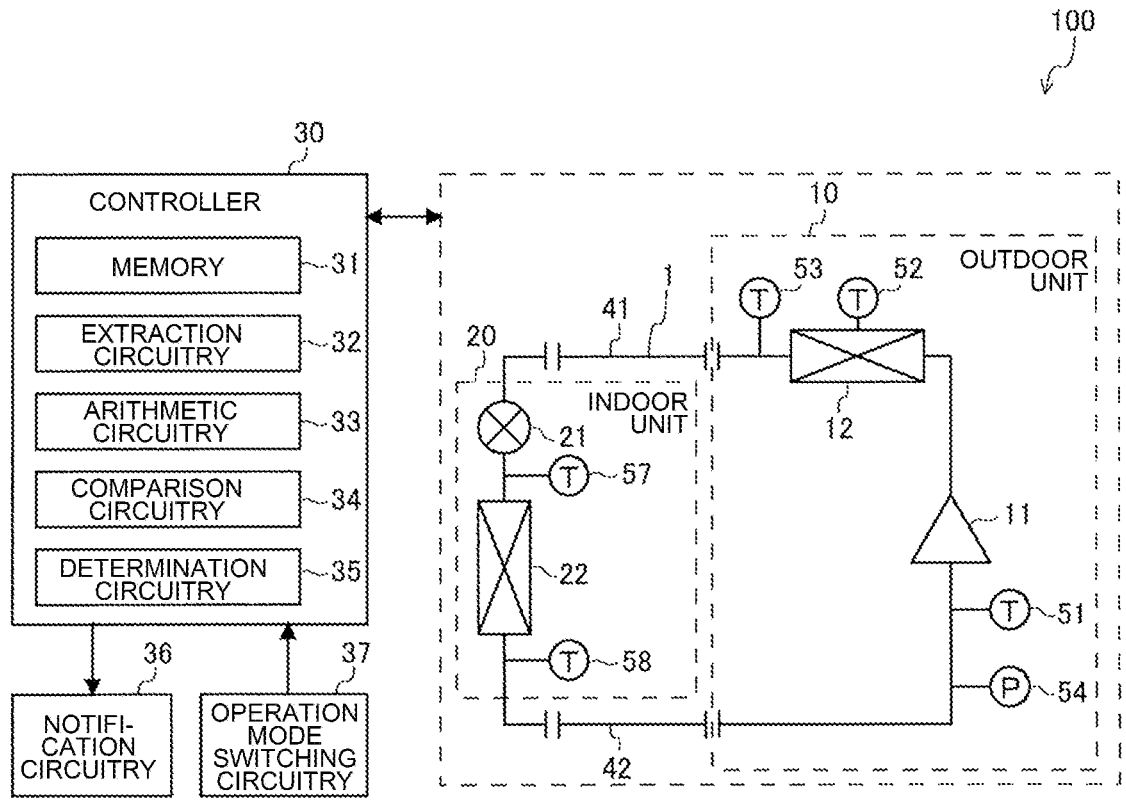
FIG. 1 is a diagram illustrating the configuration of a refrigeration cycle apparatus according to Embodiment 1.

In the following, embodiments will be described with reference to the drawings. Note that the present disclosure is not limited to the embodiments described below. In the drawings below, there may be a case where the relationship between the sizes of components may be different from an actual relationship.

Embodiment 1

FIG. 1 is a diagram illustrating the configuration of a refrigeration cycle apparatus 100 according to Embodiment 1.

In Embodiment 1, as illustrated in FIG. 1, as the refrigeration cycle apparatus 100, an example of an air-conditioning apparatus is illustrated in which one indoor unit 20 is connected to one outdoor unit 10 by a liquid pipe 41 and a gas pipe 42 (hereinafter referred to as refrigerant pipes) and that performs a cooling operation. Note that FIG. 1 illustrates the configuration of the refrigeration cycle apparatus 100 including one indoor unit 20; however, the refrigeration cycle apparatus 100 may include a plurality of indoor units 20. In this case, the indoor units 20 are connected in parallel with each other to the outdoor unit 10 by refrigerant pipes.

The outdoor unit 10 includes a compressor 11, an outdoor heat exchanger (hereinafter also referred to as a condenser) 12, a compressor suction-temperature sensor (hereinafter also referred to as a first temperature sensor) 51, a condenser two-phase temperature sensor (hereinafter also referred to as a fifth temperature sensor) 52, a condenser outlet temperature sensor 53 (hereinafter also referred to as a sixth temperature sensor), and a low-pressure pressure sensor (hereinafter also referred to as a first pressure sensor) 54.

The indoor unit 20 includes an expansion device 21, an indoor heat exchanger (hereinafter also referred to as an evaporator) 22, an evaporator inlet temperature sensor (hereinafter also referred to as a third temperature sensor) 57, and an evaporator outlet temperature sensor (hereinafter also referred to as a fourth temperature sensor) 58.

The refrigeration cycle apparatus 100 includes a refrigeration cycle circuit 1 in which the compressor 11, the outdoor heat exchanger 12, the expansion device 21, and the indoor heat exchanger 22 are connected by refrigerant pipes to have an annular shape and in which refrigerant circulates. Note that the refrigeration cycle circuit 1 may have a configuration in which a flow switch device such as a four-way valve is connected. With such a configuration, the refrigeration cycle circuit 1 is configured to perform a heating operation in addition to the cooling operation.

Moreover, the refrigeration cycle apparatus 100 includes a controller 30, a notification circuitry 36, and an operation mode switching circuitry 37. The notification circuitry 36 and the operation mode switching circuitry 37 are individually connected to the controller 30. Note that the notification circuitry 36 and the operation mode switching circuitry 37 may be included in the controller 30 as part of the controller 30.

The compressor 11 is a fluid machine that sucks and compresses low-temperature and low-pressure gas refrigerant to discharge high-temperature and high-pressure gas refrigerant. When the compressor 11 operates, refrigerant circulates through the refrigeration cycle circuit 1. The compressor 11 is, for example, an inverter-driven compressor whose operation frequency is adjustable. Operation of the compressor 11 is controlled by the controller 30.

The outdoor heat exchanger 12 exchanges heat between refrigerant and outdoor air and serves as a condenser. A fan (not illustrated) may be provided to the vicinity of the outdoor heat exchanger 12. In this case, the volume of air is changed by changing the rotation frequency of the fan, and the amount of heat to be transferred to outdoor air, that is, a heat exchange amount with outdoor air is changed.

The expansion device 21 adiabatically expands refrigerant. The expansion device 21 is, for example, an electronic expansion valve or a thermal expansion valve. The opening degree of the expansion device 21 is controlled by the controller 30 such that the degree of superheat at an outlet of the indoor heat exchanger 22 approaches a target value.

The indoor heat exchanger 22 exchanges heat between refrigerant and indoor air and serves as an evaporator. A fan (not illustrated) may be provided to the vicinity of the indoor heat exchanger 22. In this case, the volume of air is changed by changing the rotation frequency of the fan, and the amount of heat to be absorbed from indoor air, that is, a heat exchange amount with indoor air is changed.

The compressor suction-temperature sensor 51 is located at a suction port of the compressor 11 and is configured to detect a temperature at the suction port of the compressor 11 and output a detection signal to the controller 30. The condenser two-phase temperature sensor 52 is located at a position midway along a pipe included in the outdoor heat exchanger 12 and is configured to detect the temperature of two-phase refrigerant flowing in the outdoor heat exchanger 12 serving as a condenser and output a detection signal to the controller 30. The condenser outlet temperature sensor 53 is located between the outdoor heat exchanger 12 and the expansion device 21, and is configured to detect a temperature at an outlet of the outdoor heat exchanger 12 serving as a condenser and output a detection signal to the controller 30.

The evaporator inlet temperature sensor 57 is located between the expansion device 21 and the indoor heat exchanger 22 and is configured to detect a temperature at an inlet of the indoor heat exchanger 22 serving as an evaporator and output a detection signal to the controller 30. The evaporator outlet temperature sensor 58 is located between the indoor heat exchanger 22 and the compressor 11 and is configured to detect a temperature at the outlet of the indoor heat exchanger 22 serving as an evaporator and output a detection signal to the controller 30.

The low-pressure pressure sensor 54 is located at the suction port of the compressor 11 and is configured to detect a pressure at the suction port of the compressor 11 and output a detection signal to the controller 30.

The controller 30 includes, for example, a dedicated hardware device or a central processing unit (CPU) that executes a program stored in a memory 31, which will be described later, (the CPU is also referred to as a central processor, a processing unit, an arithmetic device, a microprocessor, or a processor).

In a case where the controller 30 is a dedicated hardware device, the controller 30 corresponds to, for example, a single circuit, a composite circuit, an application specific integrated circuit (ASIC), a field-programmable gate array (FPGA), or a combination of some or all of these items. Individual function circuitries included in the controller 30 may be respective hardware devices or may also be one hardware device.

In a case where the controller 30 is a CPU, each function executed by the controller 30 is implemented by software, firmware, or a combination of software and firmware. The software and firmware are described as programs and are stored in the memory 31. The CPU implements each function of the controller 30 by reading out and executing a program stored in the memory 31.

Note that one or some of the functions of the controller 30 may be implemented by a dedicated hardware device and one or some of the functions of the controller 30 may be implemented by software or firmware.

The controller 30 controls the compressor 11, the expansion device 21, and other devices in accordance with, for example, detection signals from various sensors located in the refrigeration cycle apparatus 100 and an operation signal from an operation unit (not illustrated) to control the entire operation of the refrigeration cycle apparatus 100. Note that the controller 30 may be located in the outdoor unit 10 or the indoor unit 20 or may be located outside the outdoor unit 10 and the indoor unit 20.

The controller 30 includes the memory 31, an extraction circuitry 32, an arithmetic circuitry 33, a comparison circuitry 34, and a determination circuitry 35 as functional blocks to make a malfunction determination. In this case, a malfunction determination is to determine whether a leak of refrigerant (hereinafter referred to as a refrigerant leak) or a malfunction of the expansion device 21 (hereinafter referred to as an expansion device malfunction) has occurred in the refrigeration cycle apparatus 100. Note that an expansion device malfunction corresponds to an open lock state in which the expansion device 21 is kept open and fails, which is a state in which, for example, the expansion device 21 is fixed open and a coil of the expansion device 21 malfunctions.

The memory 31 stores various types of information and includes a data-rewritable nonvolatile semiconductor memory such as, for example, a flash memory, an erasable programmable read-only memory (EPROM), and an electrically erasable programmable read-only memory (EEPROM). Note that the memory 31 may additionally include, for example, a data-non-rewritable nonvolatile semiconductor memory such as a read-only memory (ROM) or a data-rewritable volatile semiconductor memory such as a random access memory (RAM). The memory 31 stores pieces of temperature data and pressure data detected by various individual sensors. Note that these pieces of temperature data and pressure data are periodically acquired while the refrigeration cycle apparatus 100 is in operation. Moreover, the memory 31 stores various types of data necessary for making a malfunction determination such as, for example, values X, Y, and Z, which will be described later.

The extraction circuitry 32 extracts, from the data stored in the memory 31, data necessary for making a malfunction determination. In this case, data obtained when the compressor 11 is in operation is used to make a determination as to whether an expansion device malfunction has occurred. This is because whether an expansion device malfunction has occurred cannot be properly determined when the compressor 11 is not operated.

The arithmetic circuitry 33 performs a necessary calculation on the basis of data extracted by the extraction circuitry 32.

The comparison circuitry 34 compares a value obtained through a calculation performed by the arithmetic circuitry 33 with, for example, a preset threshold or compares values obtained through a calculation or calculations performed by the arithmetic circuitry 33 with each other.

The determination circuitry 35 determines, on the basis of a comparison result from the comparison circuitry 34, whether a refrigerant leak has occurred or whether an expansion device malfunction has occurred.

The notification circuitry 36 reports various types of information such as occurrence of a malfunction in accordance with a command from the controller 30. The notification circuitry 36 is provided with at least one out of a display that visually reports information and a speaker that acoustically reports information.

The operation mode switching circuitry 37 receives an operation mode switching operation performed by a user. When an operation mode switching operation is performed at the operation mode switching circuitry 37, a signal is output from the operation mode switching circuitry 37 to the controller 30, and the controller 30 switches the operation modes in accordance with the signal. The controller 30 has at least a normal operation mode and a malfunction detection mode as operation modes.

Next, the operation of the refrigeration cycle apparatus 100 at the time of the normal operation mode will be described. Note that, in the normal operation mode, the refrigeration cycle apparatus 100 according to Embodiment 1 performs the cooling operation. High-temperature and high-pressure gas refrigerant discharged from the compressor 11 flows into the outdoor heat exchanger 12, exchanges heat with outdoor air, and condenses to become high-pressure liquid refrigerant. Thereafter, the high-pressure liquid refrigerant is adiabatically expanded by the expansion device 21 to become low-temperature and low-pressure two-phase refrigerant. Thereafter, the low-temperature and low-pressure two-phase refrigerant flows into the indoor heat exchanger 22, exchanges heat with indoor air, and evaporates to become low-temperature and low-pressure gas refrigerant. Thereafter, the low-temperature and low-pressure gas refrigerant is sucked into the compressor 11 and is compressed again.

As a method for changing the air conditioning performance of the indoor unit 20, there is a method for controlling the degree of superheat at the outlet of the indoor heat exchanger 22. With this method, to achieve a desired air conditioning performance at the indoor unit 20, the opening degree of the expansion device 21 is adjusted such that the degree of superheat at the outlet of the indoor heat exchanger 22 becomes equal to a target value. Note that the heat exchange amount at the indoor heat exchanger 22 changes depending on the magnitude of the degree of superheat. For this reason, by setting a target value for the degree of superheat at the outlet of the indoor heat exchanger 22 depending on a necessary air conditioning performance, the indoor unit 20 provides the desired air conditioning performance.

In a case where the temperature difference between a set temperature of the indoor unit 20 and an indoor space temperature is large, the target value of the degree of superheat at the outlet of the indoor heat exchanger 22 is set to a small value. In contrast, in a case where the temperature difference between the set temperature of the indoor unit 20 and the indoor space temperature is small, the target value of the degree of superheat at the outlet of the indoor heat exchanger 22 is set to a large value. The opening degree of the expansion device 21 is adjusted such that the degree of superheat at the outlet of the indoor heat exchanger 22 approaches the target value. Consequently, a necessary amount of refrigerant is supplied to the indoor heat exchanger 22.

Note that, in the above-described method for changing the air conditioning performance of the indoor unit 20, the target value of the degree of superheat at the outlet of the indoor heat exchanger 22 is changed depending on the temperature difference between the set temperature and the indoor space temperature; however, the target value does not have to be changed in this manner. The target value may be constant regardless of the temperature difference between the set temperature and the indoor space temperature.

Next, a malfunction determination method for the refrigeration cycle apparatus 100 will be described. Between normal times, at the time of occurrence of a refrigerant leak, and at the time of occurrence of an expansion device malfunction of the refrigeration cycle apparatus 100, a difference arises in any one of the values of the degree of subcooling at the outlet of the outdoor heat exchanger 12 (hereinafter referred to as a degree of subcooling SC at the condenser outlet), the degree of superheat at the suction port of the compressor 11 (hereinafter referred to as a degree of superheat $SH_S$ at the compressor suction port), and the degree of superheat at the outlet of the indoor heat exchanger 22 (hereinafter referred to as a degree of superheat $SH_{IC}$ at the evaporator outlet). Thus, the refrigeration cycle apparatus 100 according to Embodiment 1 makes a malfunction determination by use of these values.

Note that the degree of superheat $SH_S$ at the compressor suction port is calculated by subtracting, from a temperature detected by the compressor suction-temperature sensor 51, an evaporation temperature into which a pressure detected by the low-pressure pressure sensor 54 is converted. The degree of subcooling SC at the condenser outlet is calculated by subtracting a temperature detected by the condenser outlet temperature sensor 53 from a temperature detected by the condenser two-phase temperature sensor 52. The degree of superheat $SH_{IC}$ at the evaporator outlet is calculated by subtracting a temperature detected by the evaporator outlet temperature sensor 58 from a temperature detected by the evaporator inlet temperature sensor 57. Note that, to calculate the degree of subcooling SC at the condenser outlet, an example is described in which the temperature detected by the condenser outlet temperature sensor 53 is subtracted from the temperature detected by the condenser two-phase temperature sensor 52; however, the manner in which the degree of subcooling SC at the condenser outlet is calculated is not limited to this example. For example, a pressure sensor is located on the high-pressure side instead of the condenser two-phase temperature sensor 52, and the degree of subcooling SC at the condenser outlet may be calculated by subtracting the temperature detected by the condenser outlet temperature sensor 53 from a saturated liquid temperature into which a pressure detected by the pressure sensor is converted.

The following will describe differences that arise in the refrigeration cycle apparatus 100 between normal times, at the time of occurrence of a refrigerant leak, and at the time of occurrence of an expansion device malfunction.

Figure 2:
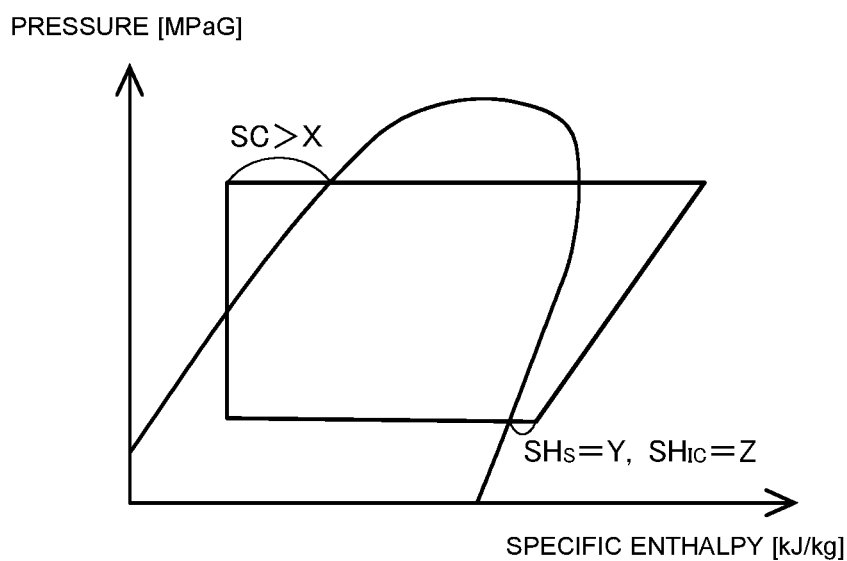
FIG. 2 is a p-h diagram of the refrigeration cycle apparatus according to Embodiment 1 at normal times.

FIG. 2 is a p-h diagram of the refrigeration cycle apparatus 100 according to Embodiment 1 at normal times.

As illustrated in FIG. 2, at normal times, the opening degree of the expansion device 21 is adjusted such that the degree of superheat $SH_{IC}$ at the evaporator outlet becomes equal to the value Z, which is a target value. Thus, in an ideal form in which heat is not transferred through refrigerant pipes or other components, the degree of superheat $SH_S$ at the compressor suction port=the degree of superheat $SH_{IC}$ at the evaporator outlet. However, when heat transfer through refrigerant pipes and other factors are taken into consideration, the degree of superheat $SH_S$ at the compressor suction port represents the value Y, which is set in consideration of heat transfer and other factors. Moreover, to operate the refrigeration cycle apparatus 100 highly efficiently, refrigerant is filled such that the degree of subcooling SC at the condenser outlet becomes greater than the value X, which is preset. Thus, at normal times, the degree of subcooling SC at the condenser outlet >X, the degree of superheat $SH_{IC}$ at the evaporator outlet=Z, and the degree of superheat $SH_S$ at the compressor suction port=Y. Note that the value Z is, for example, 5 and is a value set depending on a necessary air conditioning performance. The value Y is, for example, 6 and is a value based on the value Z and set in consideration of heat transfer and other factors. The value X is, for example, 10 and is a value set to increase operating efficiency.

Figure 3:
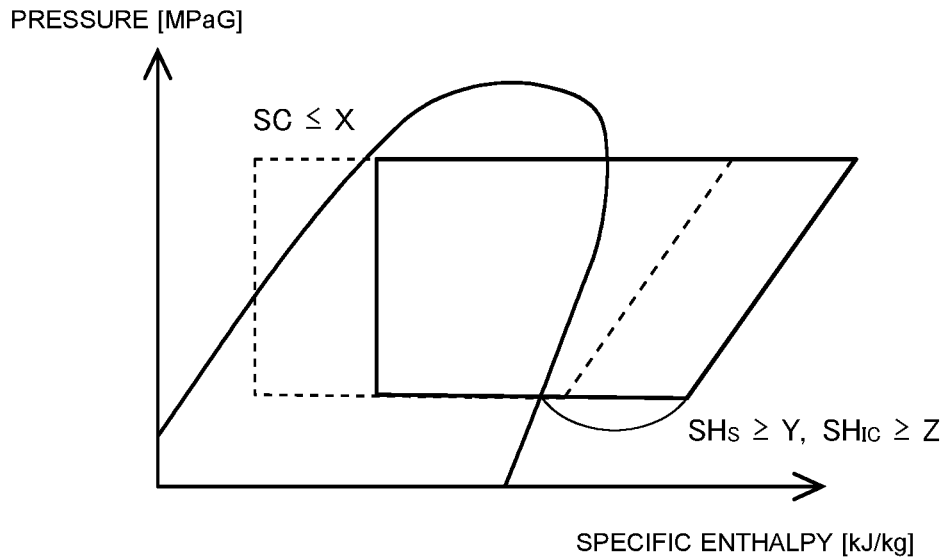
FIG. 3 is a p-h diagram of the refrigeration cycle apparatus according to Embodiment 1 at the time of occurrence of a refrigerant leak.

FIG. 3 is a p-h diagram of the refrigeration cycle apparatus 100 according to Embodiment 1 at the time of occurrence of a refrigerant leak.

As illustrated in FIG. 3, when a refrigerant leaks, the amount of liquid refrigerant decreases, and the degree of subcooling SC at the condenser outlet decreases.

Because of the decrease in the degree of subcooling SC at the condenser outlet, the degree of superheat $SH_{IC}$ at the evaporator outlet is likely to increase. Thus, in a case where there is an allowable margin left for the opening degree of the expansion device 21, the degree of superheat $SH_{IC}$ at the evaporator outlet is kept at the value Z by increasing the opening degree. However, in a case where the opening degree of the expansion device 21 is maximum possible and there is no allowable margin left, the degree of superheat $SH_{IC}$ at the evaporator outlet gradually increases, and the degree of superheat $SH_S$ at the compressor suction port, the temperature at a discharge port of the compressor 11, and the degree of superheat at the discharge port of the compressor 11 also increase. Thus, at the time of occurrence of a refrigerant leak, the degree of subcooling SC at the condenser outlet ≤X, the degree of superheat $SH_{IC}$ at the evaporator outlet ≥Z, and the degree of superheat $SH_S$ at the compressor suction port ≥Y.

Figure 4:
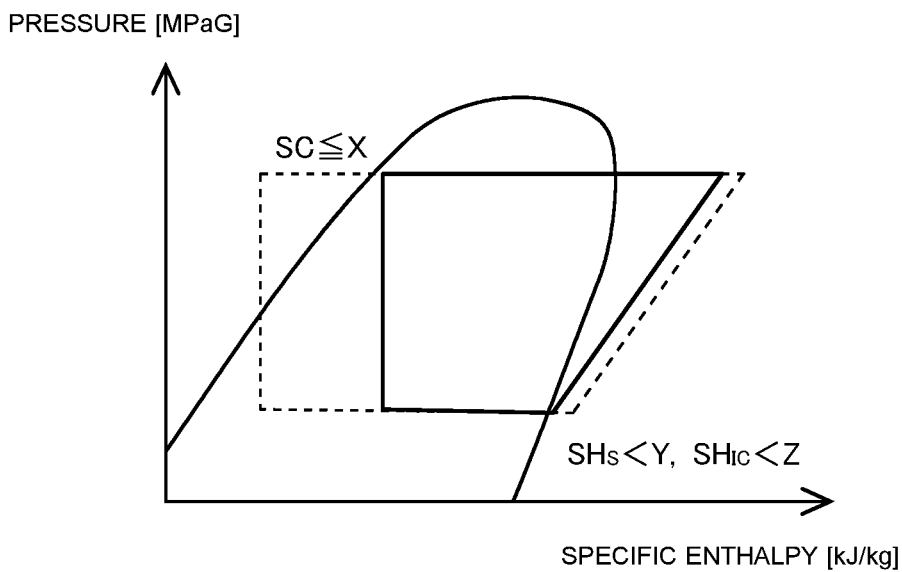
FIG. 4 is a p-h diagram of the refrigeration cycle apparatus according to Embodiment 1 at the time of occurrence of an expansion device malfunction.

FIG. 4 is a p-h diagram of the refrigeration cycle apparatus 100 according to Embodiment 1 at the time of occurrence of an expansion device malfunction.

As illustrated in FIG. 4, in a case where an expansion device malfunction has occurred, the expansion device 21 becomes out of control in a state where the expansion device 21 is kept open, and thus the degree of superheat $SH_{IC}$ at the evaporator outlet has a value away from the value Z. When the expansion device 21 becomes out of control in a state where the expansion device 21 is open wider than the opening degree corresponding to a case where the degree of superheat $SH_{IC}$ at the evaporator outlet is the value Z, the degree of superheat $SH_{IC}$ at the evaporator outlet becomes smaller than the value Z. In this manner, when the expansion device 21 becomes out of control in a state where the expansion device 21 is open wider than the opening degree corresponding to the case where the degree of superheat $SH_{IC}$ at the evaporator outlet is the value Z, high-pressure liquid refrigerant moves to the low-pressure side, and refrigerant at the suction port of the compressor 11 and refrigerant at the discharge port of the compressor 11 are likely to be wet. Thus, at the time of occurrence of an expansion device malfunction, the degree of subcooling SC at the condenser outlet ≤X, the degree of superheat $SH_{IC}$ at the evaporator outlet <Z, and the degree of superheat $SH_S$ at the compressor suction port <Y.

Figure 5:
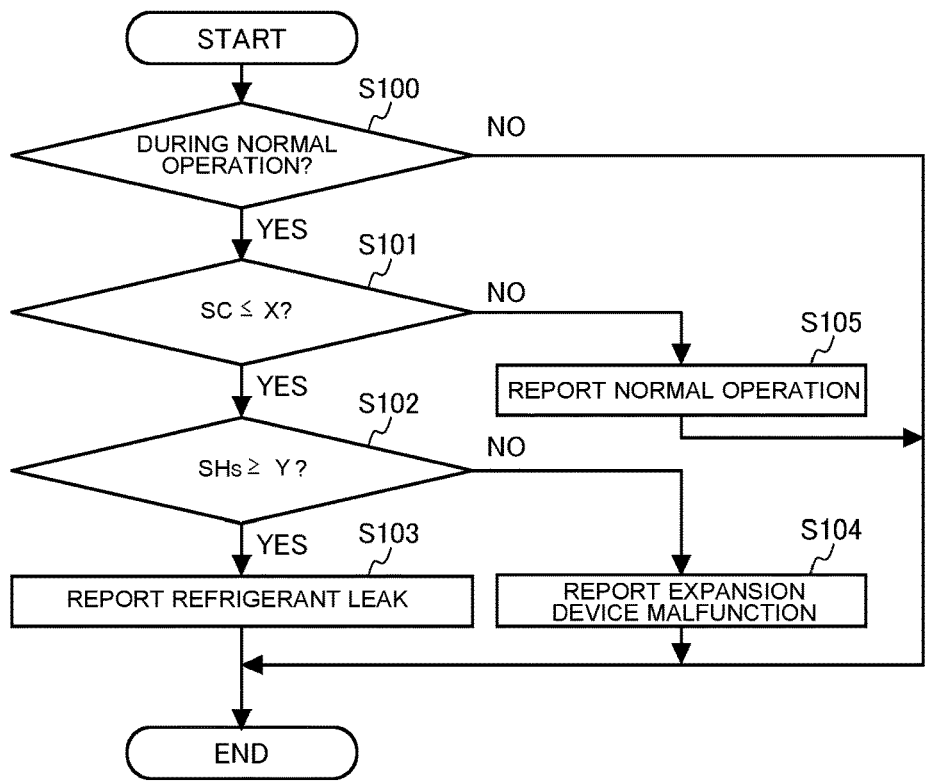
FIG. 5 is a flow chart illustrating the procedure of control performed at the time of a malfunction detection mode of the refrigeration cycle apparatus according to Embodiment 1.

FIG. 5 is a flow chart illustrating the procedure of control performed at the time of the malfunction detection mode of the refrigeration cycle apparatus 100 according to Embodiment 1.

In the malfunction detection mode, it is determined whether a refrigerant leak has occurred or whether an expansion device malfunction has occurred. The controller 30 repeatedly executes malfunction determination processing illustrated in FIG. 5 at predetermined time intervals at the time of the malfunction detection mode. Note that the controller 30 may be configured to execute the malfunction determination processing illustrated in FIG. 5 also at the time of the normal operation mode. The following will describe, with reference to FIG. 5, the procedure of control performed at the time of the malfunction detection mode of the refrigeration cycle apparatus 100 according to Embodiment 1.

(Step S100)

The controller 30 determines whether what is called a normal operation that excludes, for example, a defrosting operation or an operation for protecting the compressor 11 is being performed. In a case where the controller 30 determines that the normal operation is being performed (YES), the process proceeds to processing in step S101. In contrast, in a case where the controller 30 determines that the normal operation is not being performed (NO), the malfunction determination processing ends. The reason why the malfunction determination processing ends in this manner in a case where the normal operation is not being performed is because a malfunction cannot be properly determined even when the malfunction determination processing is executed while an operation other than the normal operation is being performed.

(Step S101)

The controller 30 determines whether the degree of subcooling SC at the condenser outlet is less than or equal to the value X. In this determination, it is determined whether a refrigerant leak or an expansion device malfunction has occurred. In a case where the controller 30 determines that the degree of subcooling SC at the condenser outlet is less than or equal to the value X (YES), the process proceeds to processing in step S102. In contrast, in a case where the controller 30 determines that the degree of subcooling SC at the condenser outlet is not less than or equal to the value X (NO), the process proceeds to processing in step S105.

(Step S102)

The controller 30 determines whether the degree of superheat $SH_S$ at the compressor suction port is greater than or equal to the value Y. In this determination, it is determined which one of a refrigerant leak and an expansion device malfunction has occurred. In a case where the controller 30 determines that the degree of superheat $SH_S$ at the compressor suction port is greater than or equal to the value Y (YES), the process proceeds to processing in step S103. In contrast, in a case where the controller 30 determines that the degree of superheat $SH_S$ at the compressor suction port is not greater than or equal to the value Y (NO), the process proceeds to processing in step S104.

(Step S103)

The controller 30 reports that a refrigerant leak has occurred by use of the notification circuitry 36.

(Step S104)

The controller 30 reports that an expansion device malfunction has occurred by use of the notification circuitry 36.

(Step S105)

The controller 30 reports that the refrigeration cycle apparatus 100 is normal by use of the notification circuitry 36. Note that processing in step S105 may be omitted.

Here, even in a case where a plurality of indoor units 20 are connected to the outdoor unit 10, substantially the same processing as above will be performed.

Figure 6:
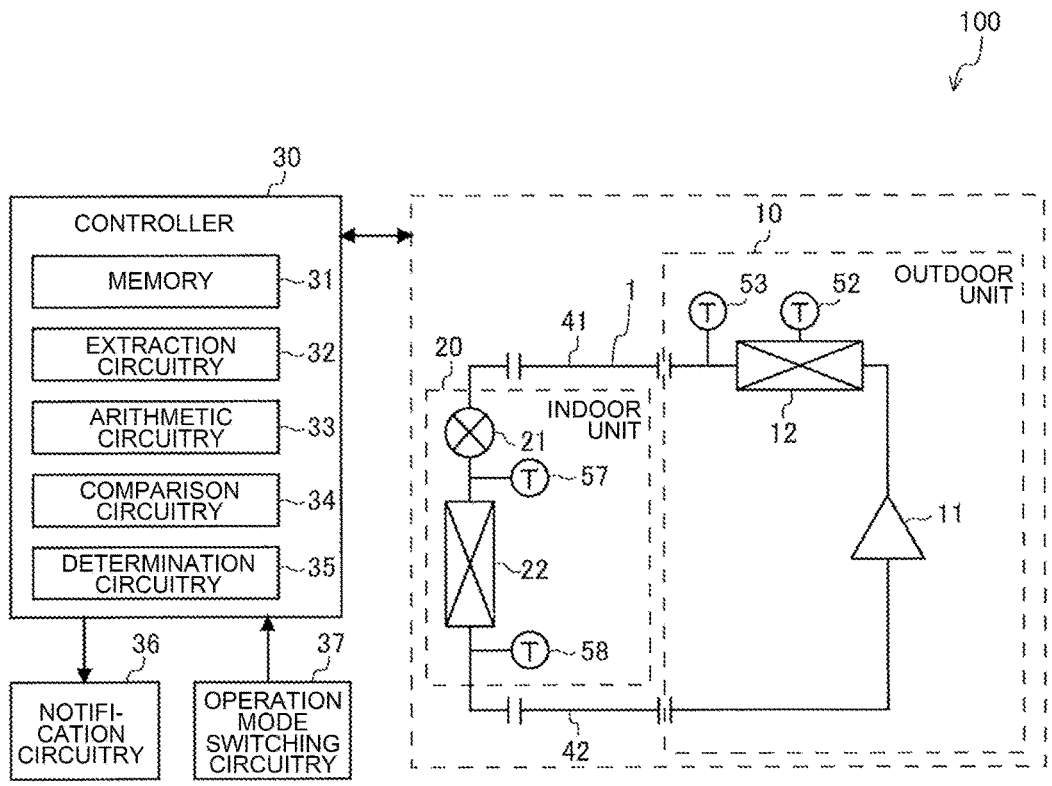
FIG. 6 is a diagram illustrating the configuration of a modification of the refrigeration cycle apparatus according to Embodiment 1.

FIG. 6 is a diagram illustrating the configuration of a modification of the refrigeration cycle apparatus 100 according to Embodiment 1.

As illustrated in FIG. 6, the outdoor unit 10 may have a configuration in which the compressor suction-temperature sensor 51 and the low-pressure pressure sensor 54 are not provided. Other than that, the configuration is the same as that illustrated in FIG. 1. In this manner, even in a case where the outdoor unit 10 has a configuration in which the compressor suction-temperature sensor 51 and the low-pressure pressure sensor 54 are not provided, malfunction determination processing is executed, and thus the number of parts is reduced.

Figure 7:
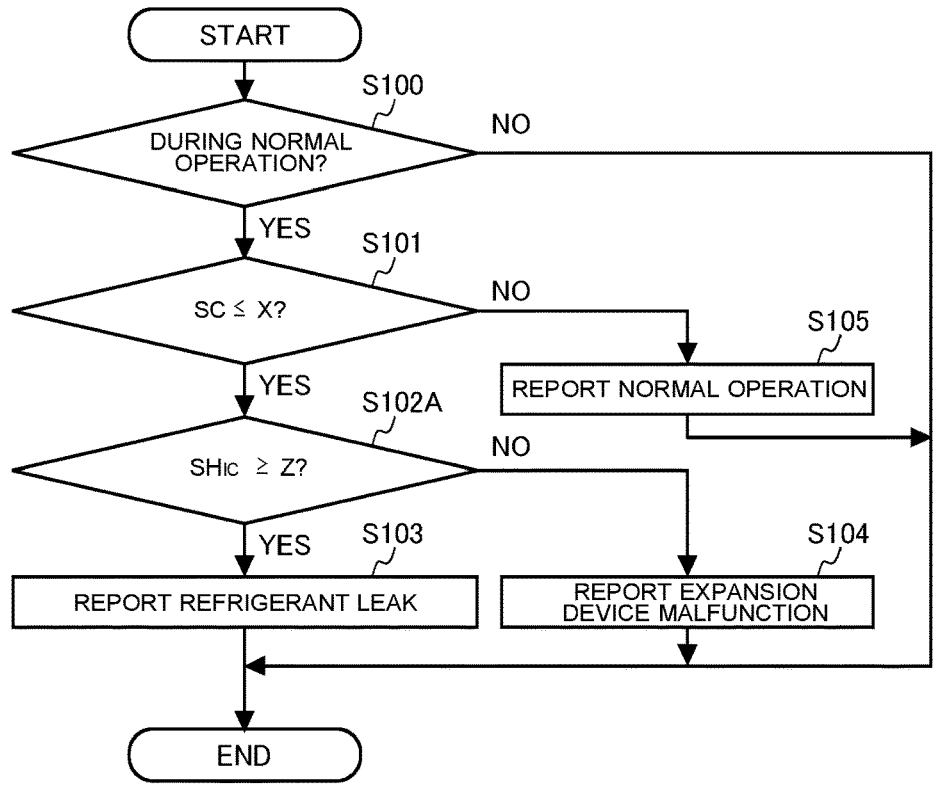
FIG. 7 is a flow chart illustrating the procedure of control performed at the time of a malfunction detection mode of the modification of the refrigeration cycle apparatus according to Embodiment 1.

FIG. 7 is a flow chart illustrating the procedure of control performed at the time of a malfunction detection mode of a modification of the refrigeration cycle apparatus 100 according to Embodiment 1.

The following will describe, with reference to FIG. 7, the procedure of control performed at the time of the malfunction detection mode of the modification of the refrigeration cycle apparatus 100 according to Embodiment 1. Note that processing in steps S100, S101, and S103 to S105 is the same as the processing that has already been described, and thus description of the same processing will be omitted. Note that, in step S101 illustrated in FIG. 7, "the process proceeds to processing in step S102" in the description of step S101 described above will be read as "the process proceeds to processing in step S102A".

(Step S102A)

The controller 30 determines whether the degree of superheat $SH_{IC}$ at the evaporator outlet is greater than or equal to the value Z. In this determination, it is determined which one of a refrigerant leak and an expansion device malfunction has occurred. In a case where the controller 30 determines that the degree of superheat $SH_{IC}$ at the evaporator outlet is greater than or equal to the value Z (YES), the process proceeds to processing in step S103. In contrast, in a case where the controller 30 determines that the degree of superheat $SH_{IC}$ at the evaporator outlet is not greater than or equal to the value Z (NO), the process proceeds to processing in step S104.

Figure 8:
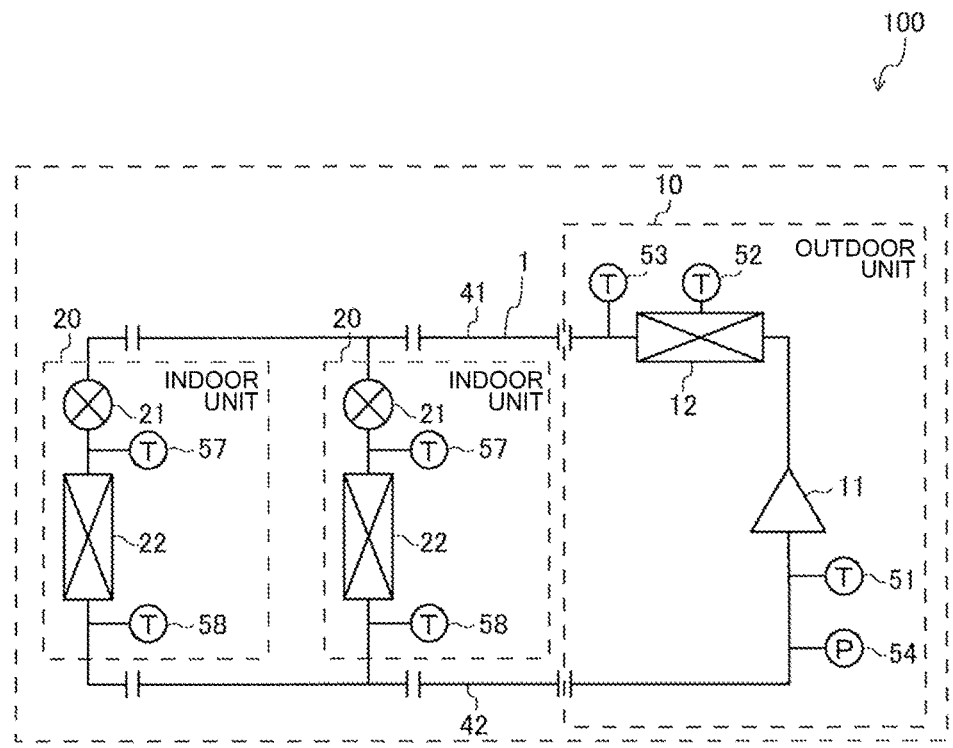
FIG. 8 is a diagram illustrating the configuration of a modification of the refrigeration cycle apparatus according to Embodiment 1 for a case where the modification includes a plurality of indoor units.
Figure 9:
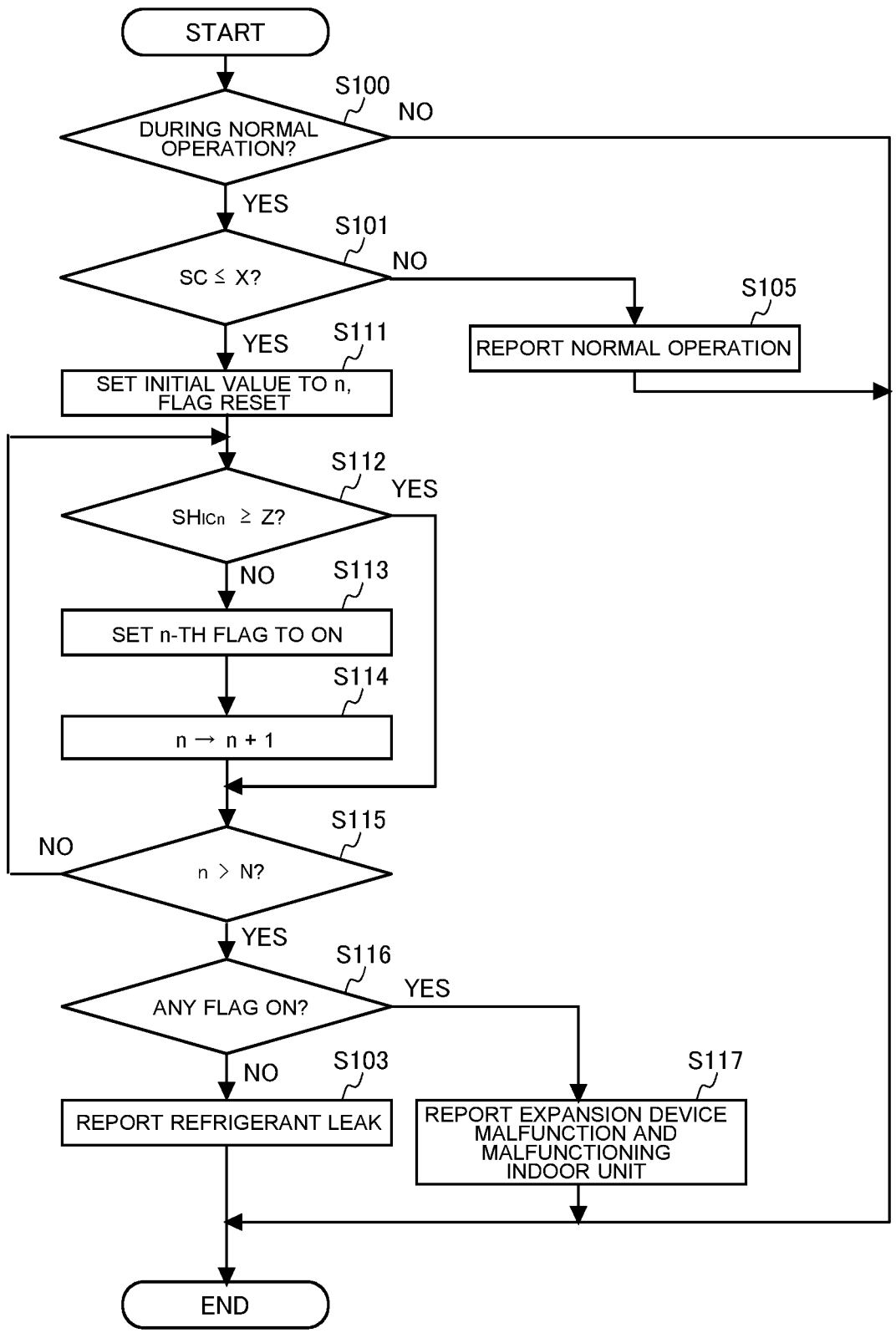
FIG. 9 is a flow chart illustrating the procedure of control performed at the time of a malfunction detection mode of the modification of the refrigeration cycle apparatus according to Embodiment 1 for the case where the modification includes the plurality of indoor units.

FIG. 8 is a diagram illustrating the configuration of a modification of the refrigeration cycle apparatus 100 according to Embodiment 1 for a case where the modification includes a plurality of indoor units 20. FIG. 9 is a flow chart illustrating the procedure of control performed at the time of the malfunction detection mode of the modification of the refrigeration cycle apparatus 100 according to Embodiment 1 for the case where the modification includes the plurality of indoor units 20. Note that, in FIG. 8, illustration of the controller 30, the notification circuitry 36, and the operation mode switching circuitry 37 is omitted.

The following will describe, with reference to FIG. 9, the procedure of control performed at the time of the malfunction detection mode in a case where the plurality of indoor units 20 are connected to the outdoor unit 10 as illustrated in FIG. 8. Note that processing in steps S100, S101, S103, and S105 is the same as the processing that has already been described, and thus description of the same processing will be omitted. Note that, in step S101 illustrated in FIG. 9, "the process proceeds to processing in step S102" in the description of step S101 described above will be read as "the process proceeds to processing in step S111".

(Step S111)

The controller 30 sets 1, which is an initial value, to n and also performs a flag reset. In this case, the plurality of indoor units 20 are each numbered with the corresponding one of different numbers starting from the initial value, and n corresponds to the numbers of the indoor units 20. In the flag reset, all the flags provided to correspond to the respective indoor units 20 are set to off. Note that n and each flag are stored in, for example, the memory 31.

(Step S112)

The controller 30 determines whether a degree of superheat $SH_{ICn}$ at an evaporator outlet is greater than or equal to the value Z. In this case, the degree of superheat $SH_{ICn}$ at the evaporator outlet is the degree of superheat at the outlet of the indoor heat exchanger 22 of the n-th indoor unit 20. In this determination, it is determined whether an expansion device malfunction has occurred in the n-th indoor unit 20, which is the target indoor unit 20. In a case where the controller 30 determines that the degree of superheat $SH_{ICn}$ at the evaporator outlet is greater than or equal to the value Z (YES), the process proceeds to processing in step S115. In contrast, in a case where the controller 30 determines that the degree of superheat $SH_{ICn}$ at the evaporator outlet is not greater than or equal to the value Z (NO), the process proceeds to processing in step S113.

(Step S113)

The controller 30 sets the flag corresponding to the n-th indoor unit 20 to on. As a result, the controller 30 determines in which one of the indoor units 20 an expansion device malfunction has occurred. That is, the controller 30 determines that an expansion device malfunction has occurred in the indoor unit 20 that is numbered and for which the flag is set to on.

(Step S114)

The controller 30 adds 1 to n. This setting is to change the target indoor unit 20 to the indoor unit 20 corresponding to the next number to make a determination in step S112.

(Step S115)

The controller 30 determines whether n is greater than N, which is the number of indoor units 20. In this determination, it is determined whether a determination as to whether an expansion device malfunction has occurred has been made for all the indoor units 20. In a case where the controller 30 determines that n is greater than N (YES), the process proceeds to processing in step S116. In contrast, in a case where the controller 30 determines that n is not greater than N (NO), the process returns to processing in step S112.

(Step S116)

The controller 30 determines whether there is a flag set to on. In a case where the controller 30 determines that there is at least one flag set to on (YES), the process proceeds to processing in step S117. In contrast, in a case where the controller 30 determines that there is no flag set to on (NO), the process proceeds to processing in step S103.

(Step S117)

By use of the notification circuitry 36, the controller 30 reports that an expansion device malfunction has occurred and the number of the indoor unit 20 in which the expansion device malfunction has occurred or reports that expansion device malfunctions have occurred and the numbers of the indoor units 20 in which the expansion device malfunctions have occurred.

In this manner, in a case where a plurality of indoor units 20 are provided, an indoor unit 20 in which an expansion device malfunction has occurred cannot be identified among the indoor units 20 with the forms of Embodiment 1 illustrated in FIGS. 5 and 7; however, in the modification of Embodiment 1 illustrated in FIG. 9, an indoor unit 20 in which an expansion device malfunction has occurred is identified among the indoor units 20.

As described above, the refrigeration cycle apparatus 100 according to Embodiment 1 includes the refrigeration cycle circuit 1 and the controller 30. The refrigeration cycle circuit 1 has the compressor 11, the condenser 12, the expansion device 21, and the evaporator 22 that are connected through the pipes, and the refrigeration cycle circuit 1 is configured to allow refrigerant to circulate in the refrigeration cycle circuit 1. The controller 30 is configured to determine whether the refrigerant leaks or whether the expansion device malfunctions on the basis of the degree of subcooling at the outlet of the condenser 12 and the degree of superheat at the outlet of the evaporator 22 or the degree of superheat at the suction port of the compressor 11.

The refrigeration cycle apparatus 100 according to Embodiment 1 determines whether a refrigerant leak has occurred or whether an expansion device malfunction has occurred, on the basis of the degree of subcooling at the outlet of the condenser 12 and the degree of superheat at the outlet of the evaporator 22 or on the basis of the degree of subcooling at the outlet of the condenser 12 and the degree of superheat at the suction port of the compressor 11. In this manner, whether a malfunction has occurred is determined on the basis of the degree of subcooling at the outlet of the condenser 12. In a case where it is determined that a malfunction has occurred, which one of a refrigerant leak and an expansion device malfunction has occurred is determined on the basis of the degree of superheat at the outlet of the evaporator 22 or the degree of superheat at the suction port of the compressor 11. Thus, an erroneous determination that refrigerant is leaking is prevented from being made.

The refrigeration cycle apparatus 100 according to Embodiment 1 includes the notification circuitry 36 configured to report a cause of a malfunction. The refrigeration cycle apparatus 100 according to Embodiment 1 is configured to accurately identify a cause of a malfunction and report the cause by use of the notification circuitry 36, and thus the refrigeration cycle apparatus 100 is recovered early and the failure period of the refrigeration cycle apparatus 100 is shortened.

The refrigeration cycle apparatus 100 according to Embodiment 1 includes the outdoor unit 10 and the plurality of indoor units 20. The outdoor unit 10 includes the compressor 11 and the condenser 12. The plurality of indoor units 20 each include the expansion device 21 and the evaporator 22 and are connected in parallel with each other to the outdoor unit 10. In a case where the degree of subcooling at the outlet of the condenser 12 is less than or equal to a preset first threshold and the degree of superheat at the outlet of the evaporator 22 in each of the plurality of indoor units 20 is greater than or equal to a preset second threshold, the controller 30 determines that a refrigerant leak has occurred. Moreover, in a case where the degree of subcooling at the outlet of the condenser 12 is less than or equal to the preset first threshold, and the degree of superheat at the outlet of at least one of the evaporators 22 of the plurality of indoor units 20 is less than the preset second threshold, the controller 30 determines that an expansion device malfunction has occurred. Note that the first threshold corresponds to the value X described above, and the second threshold corresponds to the value Z described above.

The refrigeration cycle apparatus 100 according to Embodiment 1 is configured to determine that an expansion device malfunction has occurred in the indoor unit 20 having the evaporator 22 for which the degree of superheat at the outlet is less than the preset second threshold. Thus, even in a case where the refrigeration cycle apparatus 100 includes a plurality of indoor units 20, the refrigeration cycle apparatus 100 is configured to identify an indoor unit 20 in which an expansion device malfunction has occurred among the indoor units 20.

Embodiment 2

In the following, Embodiment 2 will be described; however, redundant description common to Embodiment 1 will be omitted, and parts the same as or substantially the same as those of Embodiment 1 will be denoted by the same reference signs.

Figure 10:
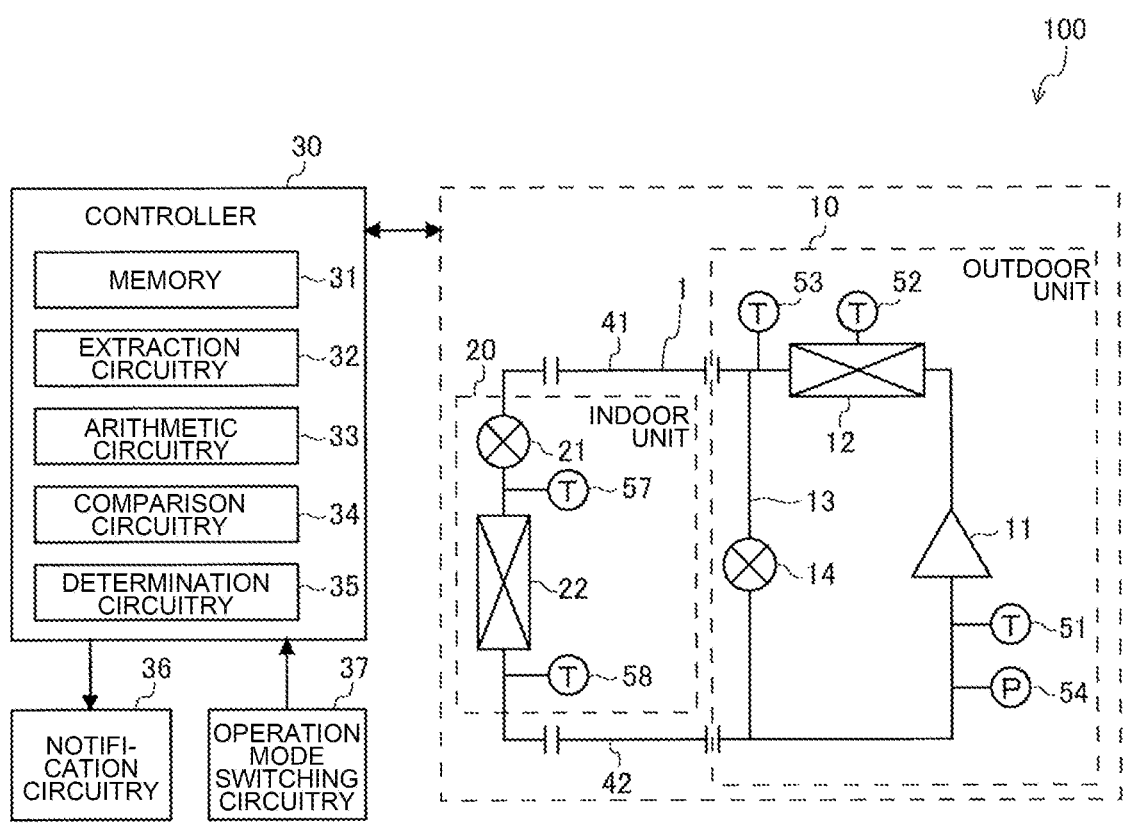
FIG. 10 is a diagram illustrating the configuration of a refrigeration cycle apparatus according to Embodiment 2.

FIG. 10 is a diagram illustrating the configuration of a refrigeration cycle apparatus 100 according to Embodiment 2.

In the refrigeration cycle apparatus 100 according to Embodiment 2, the outdoor unit 10 includes a bypass pipe 13 and a bypass valve 14. The bypass pipe 13 is connected to the refrigerant pipe connecting the outdoor heat exchanger 12 to the expansion device 21 and the refrigerant pipe connecting the indoor heat exchanger 22 to the compressor 11, and serves as a bypass to guide refrigerant at the outlet of the outdoor heat exchanger 12 to the suction port of the compressor 11. The bypass valve 14 is located in the bypass pipe 13, and adiabatically expands refrigerant flowing through the bypass pipe 13. The bypass valve 14 is, for example, an electronic expansion valve or a thermal expansion valve.

The bypass valve 14 is used to reduce an increase in pressure or temperature at the discharge port of the compressor 11. The bypass valve 14 is opened, for example, in a case where the pressure or temperature at the discharge port of the compressor 11 has increased excessively. An increase in pressure or temperature at the discharge port of the compressor 11 is reduced by temporarily moving refrigerant at the outlet of the outdoor heat exchanger 12 to the suction port of the compressor 11 via the bypass pipe 13.

Note that the other configurations of the refrigeration cycle apparatus 100 are the same as those of Embodiment 1, and thus description will be omitted.

In a case where a malfunction has occurred in the bypass valve 14, any one out of the degree of subcooling SC at the condenser outlet, the degree of superheat $SH_{IC}$ at the evaporator outlet, and the degree of superheat $SH_S$ at the compressor suction port becomes different from a corresponding one of those at normal times. Thus, the refrigeration cycle apparatus 100 according to Embodiment 2 makes a malfunction determination by use of these values. In this case, a malfunction of the bypass valve 14 (hereinafter referred to as a bypass valve malfunction) corresponds to an open lock state in which the bypass valve 14 is kept open and fails, which is a state in which, for example, the bypass valve 14 is fixed open and a coil of the bypass valve 14 malfunctions.

Figure 11:
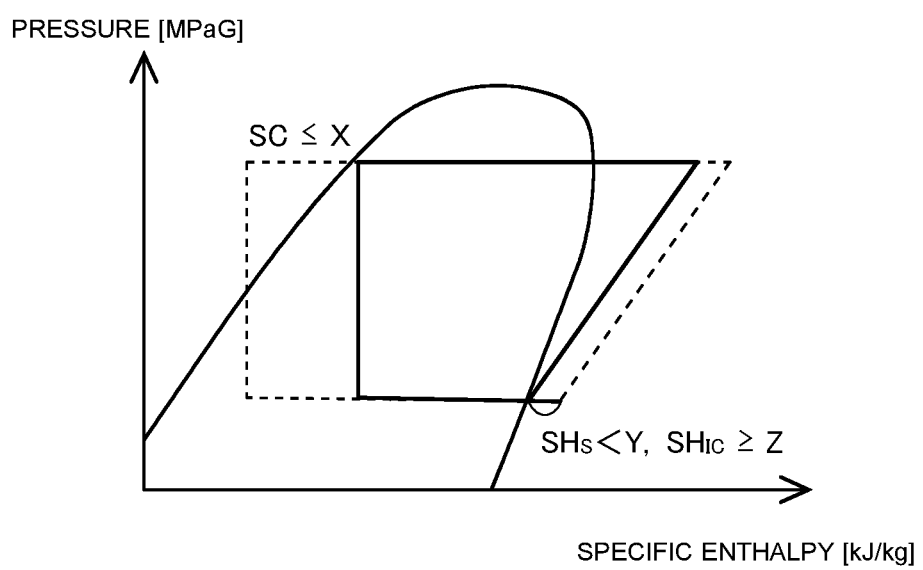
FIG. 11 is a p-h diagram of the refrigeration cycle apparatus according to Embodiment 2 at the time of occurrence of a bypass valve malfunction.

FIG. 11 is a p-h diagram of the refrigeration cycle apparatus 100 according to Embodiment 2 at the time of occurrence of a bypass valve malfunction.

As illustrated in FIG. 11, in a case where a bypass valve malfunction has occurred, the bypass valve 14 is kept open and becomes out of control. Thus, high-pressure refrigerant at the outlet of the outdoor heat exchanger 12 moves to the discharge port of the compressor 11 corresponding to the low-pressure side, and refrigerant at the suction port of the compressor 11 and refrigerant at the discharge port of the compressor 11 are likely to be wet. As a result, the degree of subcooling SC at the condenser outlet and the degree of superheat $SH_S$ at the compressor suction port decrease, and the temperature and the degree of superheat at the discharge port of the compressor 11 also decrease. In this case, high-pressure liquid refrigerant becomes nonexistent in the outdoor heat exchanger 12, and thus the degree of superheat $SH_{IC}$ at the evaporator outlet is likely to increase. In a case where there is an allowable margin left for the opening degree of the expansion device 21, the degree of superheat $SH_{IC}$ at the evaporator outlet is kept at the value Z by increasing the opening degree. However, in a case where the opening degree of the expansion device 21 is maximum possible and there is no allowable margin left, the degree of superheat $SH_{IC}$ at the evaporator outlet gradually increases. Thus, at the time of occurrence of a bypass valve malfunction, the degree of subcooling SC at the condenser outlet $\leq$X, the degree of superheat $SH_{IC}$ at the evaporator outlet $\geq$Z, and the degree of superheat $SH_S$ at the compressor suction port <Y.

Figure 12:
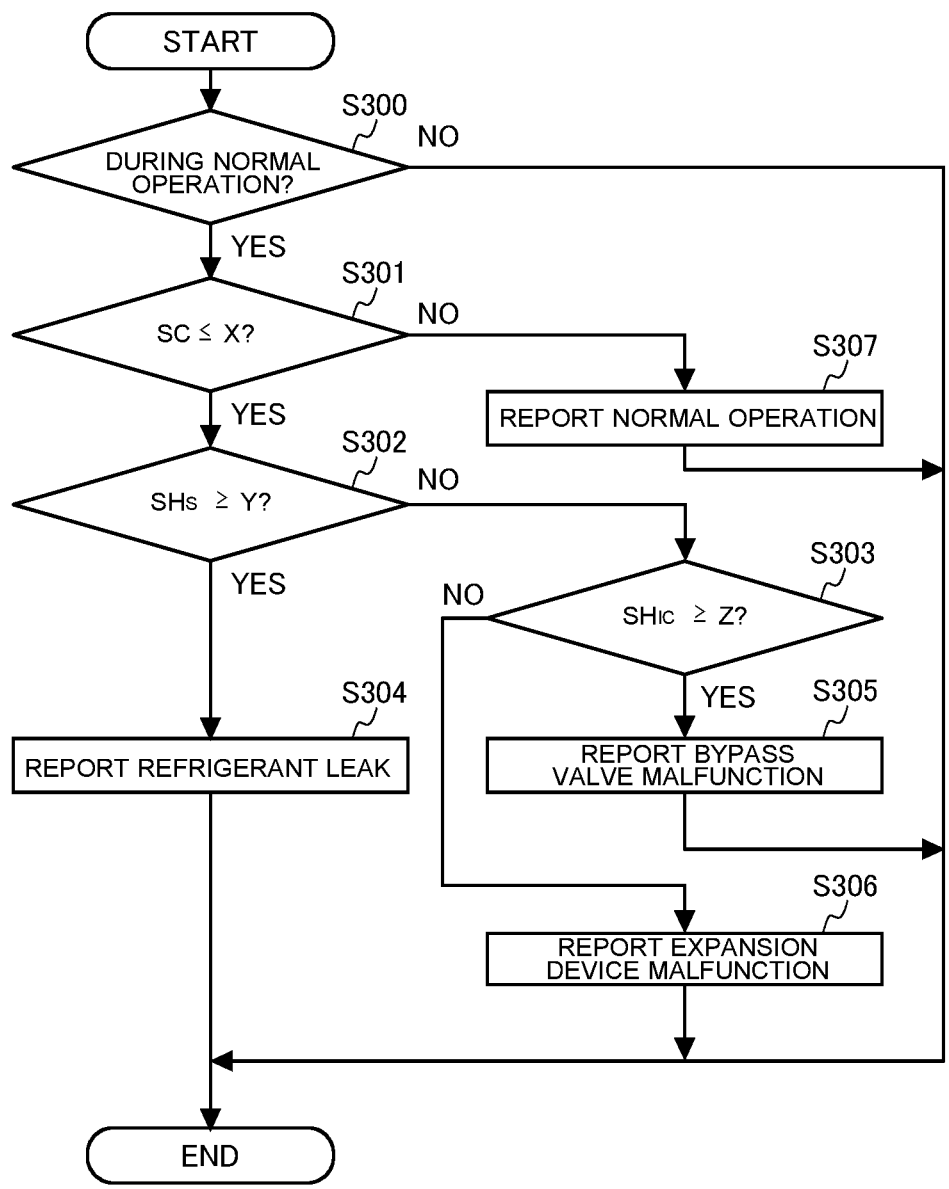
FIG. 12 is a flow chart illustrating the procedure of control performed at the time of a malfunction detection mode of the refrigeration cycle apparatus according to Embodiment 2.

FIG. 12 is a flow chart illustrating the procedure of control performed at the time of a malfunction detection mode of the refrigeration cycle apparatus 100 according to Embodiment 2.

In the malfunction detection mode, it is determined whether a refrigerant leak has occurred, whether an expansion device malfunction has occurred, or whether a bypass valve malfunction has occurred. The controller 30 repeatedly executes malfunction determination processing illustrated in FIG. 12 at predetermined time intervals at the time of the malfunction detection mode. Note that the controller 30 may be configured to execute the malfunction determination processing illustrated in FIG. 12 also at the time of the normal operation mode. The following will describe, with reference to FIG. 12, the procedure of control performed at the time of the malfunction detection mode of the refrigeration cycle apparatus 100 according to Embodiment 2.

(Step S300)

The controller 30 determines whether what is called a normal operation that excludes, for example, a defrosting operation or an operation for protecting the compressor 11 is being performed. In a case where the controller 30 determines that the normal operation is being performed (YES), the process proceeds to processing in step S301. In contrast, in a case where the controller 30 determines that the normal operation is not being performed (NO), the malfunction determination processing ends. The reason why the malfunction determination processing ends in this manner in a case where the normal operation is not being performed is because a malfunction cannot be properly determined even when the malfunction determination processing is executed while an operation other than the normal operation is being performed.

(Step S301)

The controller 30 determines whether the degree of subcooling SC at the condenser outlet is less than or equal to the value X. In this determination, it is determined whether a refrigerant leak, an expansion device malfunction, or a bypass valve malfunction has occurred. In a case where the controller 30 determines that the degree of subcooling SC at the condenser outlet is less than or equal to the value X (YES), the process proceeds to processing in step S302. In contrast, in a case where the controller 30 determines that the degree of subcooling SC at the condenser outlet is not less than or equal to the value X (NO), the process proceeds to processing in step S307.

(Step S302)

The controller 30 determines whether the degree of superheat $SH_S$ at the compressor suction port is greater than or equal to the value Y. In this determination, it is determined whether a refrigerant leak has occurred and an expansion device malfunction or a bypass valve malfunction has occurred. In a case where the controller 30 determines that the degree of superheat $SH_S$ at the compressor suction port is greater than or equal to the value Y (YES), the process proceeds to processing in step S304. In contrast, in a case where the controller 30 determines that the degree of superheat $SH_S$ at the compressor suction port is not greater than or equal to the value Y (NO), the process proceeds to processing in step S303.

(Step S303)

The controller 30 determines whether the degree of superheat $SH_{IC}$ at the evaporator outlet is greater than or equal to the value Z. In this determination, it is determined which one of an expansion device malfunction and a bypass valve malfunction has occurred. In a case where the controller 30 determines that the degree of superheat $SH_{IC}$ at the evaporator outlet is greater than or equal to the value Z (YES), the process proceeds to processing in step S305. In contrast, in a case where the controller 30 determines that the degree of superheat $SH_{IC}$ at the evaporator outlet is not greater than or equal to the value Z (NO), the process proceeds to processing in step S306.

(Step S304)

The controller 30 reports that a refrigerant leak has occurred by use of the notification circuitry 36.

(Step S305)

The controller 30 reports that a bypass valve malfunction has occurred by use of the notification circuitry 36.

(Step S306)

The controller 30 reports that an expansion device malfunction has occurred by use of the notification circuitry 36.

(Step S307)

The controller 30 reports that the refrigeration cycle apparatus 100 is normal by use of the notification circuitry 36. Note that processing in step S307 may be omitted.

Figure 13:
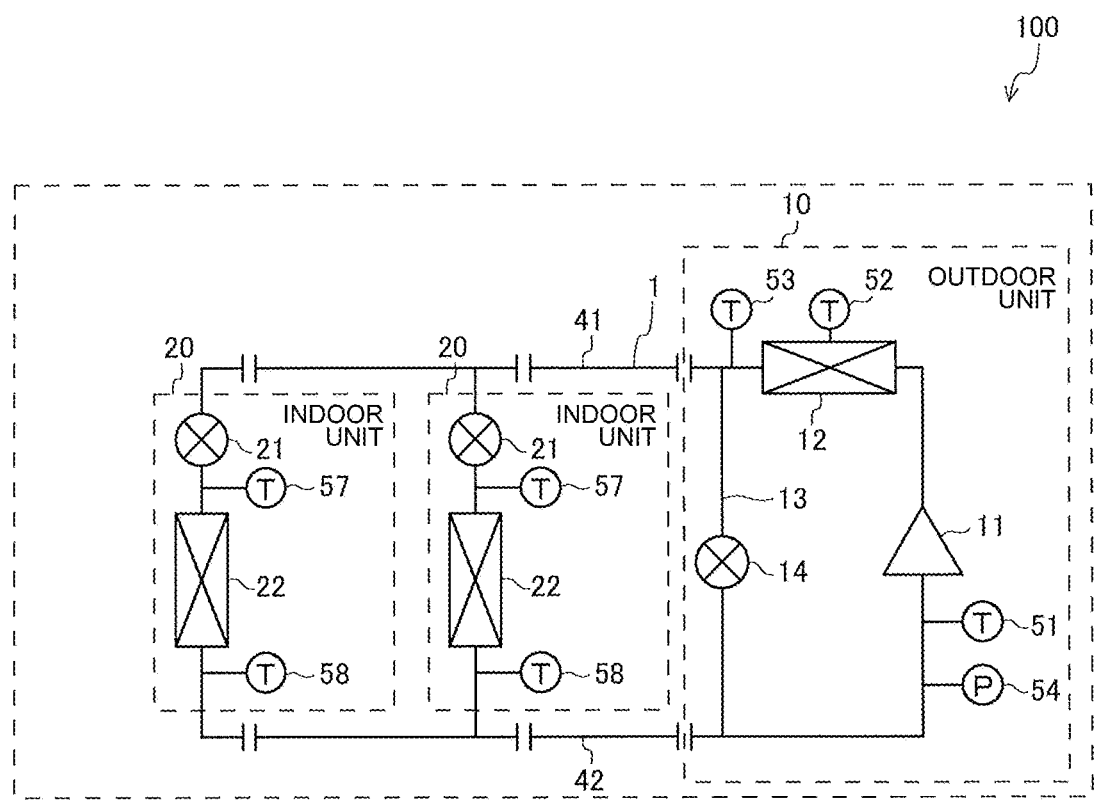
FIG. 13 is a diagram illustrating the configuration of the refrigeration cycle apparatus according to Embodiment 2 for a case where the refrigeration cycle apparatus includes a plurality of indoor units.
Figure 14:
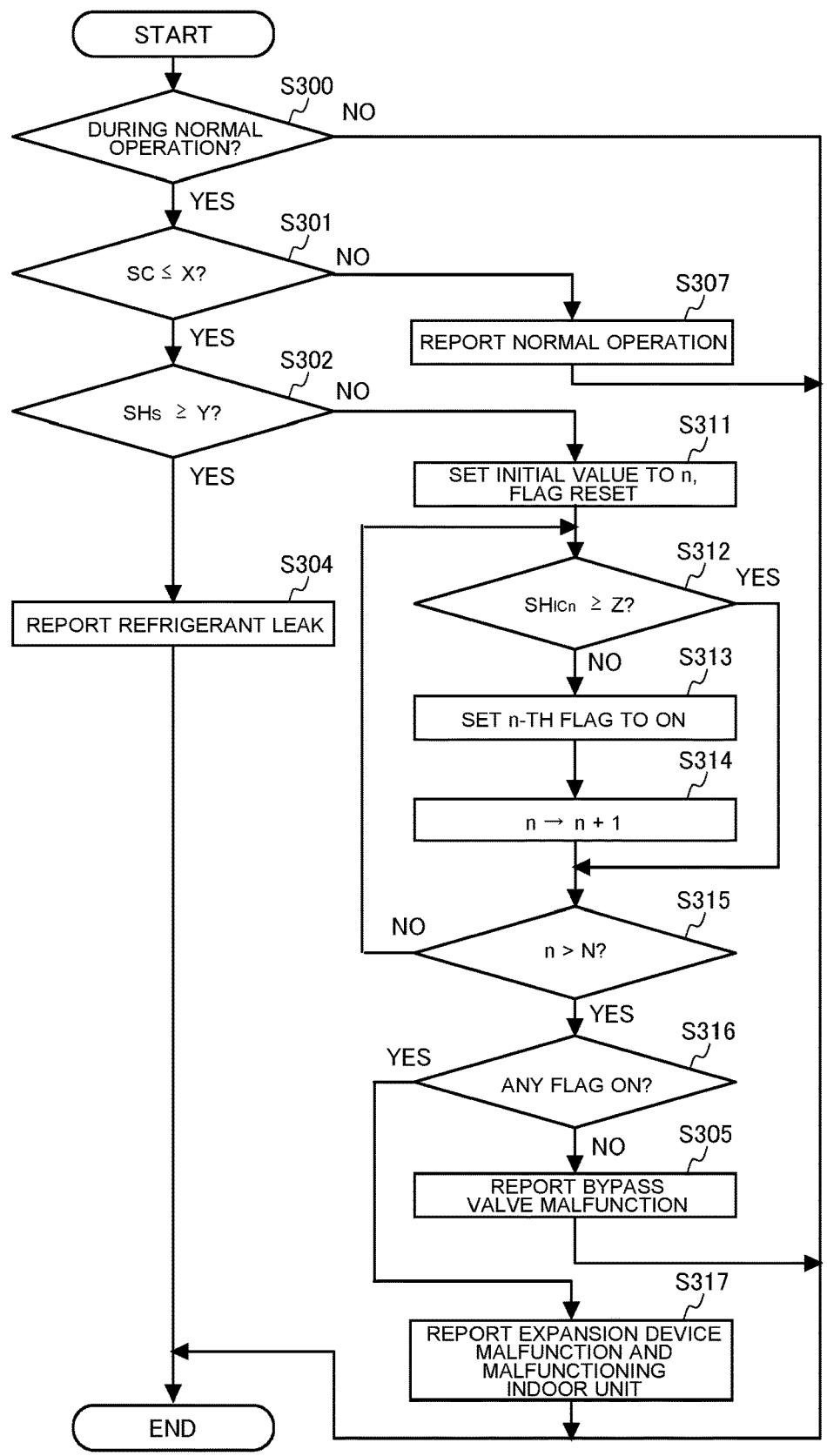
FIG. 14 is a flow chart illustrating the procedure of control performed at the time of the malfunction detection mode of the refrigeration cycle apparatus according to Embodiment 2 for the case where the refrigeration cycle apparatus includes the plurality of indoor units.

FIG. 13 is a diagram illustrating the configuration of the refrigeration cycle apparatus 100 according to Embodiment 2 for a case where the refrigeration cycle apparatus 100 includes a plurality of indoor units 20. FIG. 14 is a flow chart illustrating the procedure of control performed at the time of the malfunction detection mode for the case where the refrigeration cycle apparatus 100 according to Embodiment 2 includes the plurality of indoor units 20. Note that, in FIG. 13, illustration of the controller 30, the notification circuitry 36, and the operation mode switching circuitry 37 is omitted.

The following will describe, with reference to FIG. 14, the procedure of control performed at the time of the malfunction detection mode in a case where the plurality of indoor units 20 are connected to the outdoor unit 10 as illustrated in FIG. 13. Note that processing in steps S300 to S302, S305, and S307 is the same as the processing that has already been described, and thus description of the same processing will be omitted. Note that, in step S302 illustrated in FIG. 14, "the process proceeds to processing in step S303" in the description of step S302 described above will be read as "the process proceeds to processing in step S311".

(Step S311)

The controller 30 sets 1, which is an initial value, to n and also performs a flag reset. In this case, the plurality of indoor units 20 are each numbered with the corresponding one of different numbers starting from the initial value, and n corresponds to the numbers of the indoor units 20. In the flag reset, all the flags provided to correspond to the respective indoor units 20 are set to off. Note that n and each flag are stored in, for example, the memory 31.

(Step S312)

The controller 30 determines whether the degree of superheat $SH_{ICn}$ at the evaporator outlet is greater than or equal to the value Z. In this case, the degree of superheat $SH_{ICn}$ at the evaporator outlet is the degree of superheat at the outlet of the indoor heat exchanger 22 of the n-th indoor unit 20. In this determination, it is determined whether an expansion device malfunction has occurred in the n-th indoor unit 20, which is the target indoor unit 20. In a case where the controller 30 determines that the degree of superheat $SH_{ICn}$ at the evaporator outlet is greater than or equal to the value Z (YES), the process proceeds to processing in step S315. In contrast, in a case where the controller 30 determines that the degree of superheat $SH_{ICn}$ at the evaporator outlet is not greater than or equal to the value Z (NO), the process proceeds to processing in step S313.

(Step S313)

The controller 30 sets the flag corresponding to the n-th indoor unit 20 to on. As a result, the controller 30 determines in which one of the indoor units 20 an expansion device malfunction has occurred. That is, the controller 30 determines that an expansion device malfunction has occurred in the indoor unit 20 that is numbered and for which the flag is set to on.

(Step S314)

The controller 30 adds 1 to n. This setting is to change the target indoor unit 20 to the indoor unit 20 corresponding to the next number to make a determination in step S312.

(Step S315)

The controller 30 determines whether n is greater than N, which is the number of indoor units 20. In this determination, it is determined whether a determination as to whether an expansion device malfunction has occurred has been made for all the indoor units 20. In a case where the controller 30 determines that n is greater than N (YES), the process proceeds to processing in step S316. In contrast, in a case where the controller 30 determines that n is not greater than N (NO), the process returns to processing in step S312.

(Step S316)

The controller 30 determines whether there is a flag set to on. In a case where the controller 30 determines that there is at least one flag set to on (YES), the process proceeds to processing in step S317. In contrast, in a case where the controller 30 determines that there is no flag set to on (NO), the process proceeds to processing in step S305.

(Step S317)

By use of the notification circuitry 36, the controller 30 reports that an expansion device malfunction has occurred and the number of the indoor unit 20 in which the expansion device malfunction has occurred or reports that expansion device malfunctions have occurred and the numbers of the indoor units 20 in which the expansion device malfunctions have occurred.

As described above, the refrigeration cycle apparatus 100 according to Embodiment 2 includes the refrigeration cycle circuit 1, the bypass pipe 13, the bypass valve 14, and the controller 30. The refrigeration cycle circuit 1 has the compressor 11, the condenser 12, the expansion device 21, and the evaporator 22 that are connected through the pipes, and the refrigeration cycle circuit 1 is configured to allow refrigerant to circulate in the refrigeration cycle circuit 1. The bypass pipe 13 connects the pipe between the condenser 12 and the expansion device 21 and the pipe between the evaporator 22 and the compressor 11. The bypass valve 14 is located in the bypass pipe 13. The controller 30 is configured to determine whether the refrigerant leaks, whether the expansion device malfunctions, or whether the bypass valve malfunctions on the basis of the degree of subcooling at the outlet of the condenser 12 and the degree of superheat at the suction port of the compressor 11.

The refrigeration cycle apparatus 100 according to Embodiment 2 determines, on the basis of the degree of subcooling at the outlet of the condenser 12 and the degree of superheat at the suction port of the compressor 11, whether a refrigerant leak has occurred, whether an expansion device malfunction has occurred, or whether a bypass valve malfunction has occurred. In this manner, whether a malfunction has occurred is determined on the basis of the degree of subcooling at the outlet of the condenser 12. In a case where it is determined that a malfunction has occurred, it is determined, on the basis of the degree of superheat at the suction port of the compressor 11, whether a refrigerant leak has occurred and an expansion device malfunction or a bypass valve malfunction has occurred. Thus, an erroneous determination that refrigerant is leaking is prevented from being made.

In the refrigeration cycle apparatus 100 according to Embodiment 2, in a case where the degree of superheat at the outlet of the evaporator 22 is greater than or equal to a preset sixth threshold, the controller 30 determines that a bypass valve malfunction has occurred, and in a case where the degree of superheat at the outlet of the evaporator 22 is less than the preset sixth threshold, the controller 30 determines that an expansion device malfunction has occurred. Note that the sixth threshold corresponds to the value Z described above.

The refrigeration cycle apparatus 100 according to Embodiment 2 is also configured to determine which one of an expansion device malfunction and a bypass valve malfunction has occurred.

The refrigeration cycle apparatus 100 according to Embodiment 2 includes the notification circuitry 36 configured to report a cause of a malfunction. The refrigeration cycle apparatus 100 according to Embodiment 2 is configured to accurately identify a cause of a malfunction and report the cause by use of the notification circuitry 36, and thus the refrigeration cycle apparatus 100 is recovered early and the failure period of the refrigeration cycle apparatus 100 is shortened.

The refrigeration cycle apparatus 100 according to Embodiment 2 includes the outdoor unit 10 and the plurality of indoor units 20. The outdoor unit 10 includes the compressor 11 and the condenser 12. The plurality of indoor units 20 each include the expansion device 21 and the evaporator 22 and are connected in parallel with each other to the outdoor unit 10. In a case where the degree of subcooling at the outlet of the condenser 12 is less than or equal to a preset fourth threshold, and the degree of superheat at the suction port of the compressor 11 is less than a preset fifth threshold, and where the degree of superheat at the outlet of the evaporator 22 in each of the plurality of indoor units 20 is greater than or equal to the preset sixth threshold, the controller 30 determines that a bypass valve malfunction has occurred. Moreover, in a case where the degree of subcooling at the outlet of the condenser 12 is less than or equal to the preset fourth threshold, and the degree of superheat at the suction port of the compressor 11 is less than the preset fifth threshold, and where the degree of superheat at the outlet of at least one of the evaporators 22 of the plurality of indoor units 20 is less than the preset sixth threshold, the controller 30 determines that an expansion device malfunction has occurred. Note that the fourth threshold corresponds to the value X described above, and the fifth threshold corresponds to the value Y described above.

The refrigeration cycle apparatus 100 according to Embodiment 2 is configured to determine that an expansion device malfunction has occurred in the indoor unit 20 having the evaporator 22 for which the degree of superheat at the outlet is less than the sixth threshold. Thus, even in a case where the refrigeration cycle apparatus 100 includes a plurality of indoor units 20, the refrigeration cycle apparatus 100 is configured to identify an indoor unit 20 in which an expansion device malfunction has occurred among the indoor units 20.

In Embodiments 1 and 2, the refrigeration cycle apparatus 100, which performs the cooling operation only, has been described; however, Embodiments 1 and 2 do not have to be applied to such a refrigeration cycle apparatus and may also be applied to a refrigeration cycle apparatus that performs a heating operation only, and a refrigeration cycle apparatus that performs both the cooling operation and the heating operation.

Moreover, in Embodiments 1 and 2, the examples have been described in which the refrigeration cycle apparatus 100 is applied to an air-conditioning apparatus; however, Embodiments 1 and 2 do not have to be applied to a refrigeration cycle apparatus and may also be applied to other apparatuses such as a water heater.

REFERENCE SIGNS LIST

1: refrigeration cycle circuit, 10: outdoor unit, 11: compressor, 12: outdoor heat exchanger, 13: bypass pipe, 14: bypass valve, 20: indoor unit, 21: expansion device, 22: indoor heat exchanger, 30: controller, 31: memory, 32: extraction circuitry, 33: arithmetic circuitry, 34: comparison circuitry, 35: determination circuitry, 36: notification circuitry, 37: operation mode switching circuitry, 41: liquid pipe, 42: gas pipe, 51: compressor suction-temperature sensor, 52: condenser two-phase temperature sensor, 53: condenser outlet temperature sensor, 54: low-pressure pressure sensor, 57: evaporator inlet temperature sensor, 58: evaporator outlet temperature sensor, 100: refrigeration cycle apparatus

The invention claimed is:
1. A refrigeration cycle apparatus, comprising:
a refrigeration cycle circuit that has a compressor, a condenser, an expansion device, and an evaporator that are connected through a pipe, the refrigeration cycle circuit being configured to allow refrigerant to circulate in the refrigeration cycle circuit; and
a controller configured to determine whether the refrigerant leaks or whether the expansion device malfunctions on a basis of a degree of subcooling at an outlet of the condenser and a degree of superheat at an outlet of the evaporator or a degree of superheat at a suction port of the compressor, in a case where the degree of subcooling at the outlet of the condenser is less than or equal to a preset first threshold, and the degree of superheat at the outlet of the evaporator is less than a preset second threshold, the controller being configured to determine that the expansion device malfunctions.

2. The refrigeration cycle apparatus of claim 1, wherein, in a case where the degree of subcooling at the outlet of the condenser is less than or equal to the preset first threshold, and the degree of superheat at the outlet of the evaporator is greater than or equal to the preset second threshold, the controller is configured to determine that the refrigerant leaks.

3. The refrigeration cycle apparatus of claim 1, comprising:
a first temperature sensor located at the suction port of the compressor; and
a first pressure sensor located at the suction port of the compressor,
wherein, the controller is configured to calculate the degree of superheat at the suction port of the compressor on a basis of a temperature detected by the first temperature sensor and a pressure detected by the first pressure sensor.

4. The refrigeration cycle apparatus of claim 1, comprising:
a third temperature sensor located at an inlet of the evaporator; and
a fourth temperature sensor located at an outlet of the evaporator,
wherein, the controller is configured to calculate a degree of superheat at the outlet of the evaporator on a basis of a temperature detected by the third temperature sensor and a temperature detected by the fourth temperature sensor.

5. The refrigeration cycle apparatus of claim 1, comprising:
a fifth temperature sensor located at the condenser; and
a sixth temperature sensor located at the outlet of the condenser,
wherein the controller is configured to calculate the degree of subcooling at the outlet of the condenser on a basis of a temperature detected by the fifth temperature sensor and a temperature detected by the sixth temperature sensor.

6. The refrigeration cycle apparatus of claim 1, comprising
a notification circuitry configured to report a cause of a malfunction.

7. A refrigeration cycle apparatus, comprising:
a refrigeration cycle circuit that has a compressor, a condenser, a plurality of expansion devices, and a plurality of evaporators that are connected through a pipe, the refrigeration cycle circuit being configured to allow refrigerant to circulate in the refrigeration cycle circuit;
a controller configured to determine whether the refrigerant leaks or whether the plurality of expansion devices malfunction on a basis of a degree of subcooling at an outlet of the condenser and a degree of superheat at an outlet of he each evaporator or a degree of superheat at a suction port of the compressor;
an outdoor unit that includes the compressor and the condenser; and a plurality of indoor units that each include one of the plurality of expansion devices and one of the plurality of evaporators and connected in parallel with each other to the outdoor unit, wherein, in a case where the degree of subcooling at the outlet of the condenser is less than or equal to a preset first threshold, and the degree of superheat at the outlet of the evaporator in each of the plurality of indoor units is greater than or equal to a preset second threshold, the controller is configured to determine that the refrigerant leaks.

8. The refrigeration cycle apparatus of claim 7, wherein, in a case where the degree of subcooling at the outlet of the condenser is less than or equal to the preset first threshold, and the degree of superheat at the outlet of at least one of the evaporators in the plurality of indoor units is less than the preset second threshold, the controller is configured to determine that the plurality of expansion devices malfunction.

9. A refrigeration cycle apparatus, comprising:
a refrigeration cycle circuit that has a compressor, a condenser, an expansion device, and an evaporator that are connected through a pipe, the refrigeration cycle circuit being configured to allow refrigerant to circulate in the refrigeration cycle circuit; and
a controller configured to determine whether the refrigerant leaks or whether the expansion device malfunctions on a basis of a degree of subcooling at an outlet of the condenser and a degree of superheat at an outlet of the evaporator or a degree of superheat at a suction port of the compressor,
in a case where the degree of subcooling at the outlet of the condenser is less than or equal to a preset first threshold, and the degree of superheat at the suction port of the compressor is less than a preset third threshold, the controller being configured to determine that the expansion device malfunctions.

10. The refrigeration cycle apparatus of claim 9, wherein, in a case where the degree of subcooling at the outlet of the condenser is less than or equal to the preset first threshold, and the degree of superheat at the suction port of the compressor is greater than or equal to the preset third threshold, the controller is configured to determine that the refrigerant leaks.

11. A refrigeration cycle apparatus, comprising:
a refrigeration cycle circuit that has a compressor, a condenser, at least one expansion device, and at least one evaporator that are connected through a pipe, the refrigeration cycle circuit being configured to allow refrigerant to circulate in the refrigeration cycle circuit;
a bypass pipe that connects a pipe between the condenser and the at least one expansion device and a pipe between the at least one evaporator and the compressor;
a bypass valve located in the bypass pipe; and
a controller configured to determine whether the refrigerant leaks, whether the at least one expansion device malfunctions, or whether the bypass valve malfunctions on a basis of a degree of subcooling at an outlet of the condenser and a degree of superheat at a suction port of the compressor,
in a case where the degree of subcooling at the outlet of the condenser is less than or equal to a preset fourth threshold, and the degree of superheat at the suction port of the compressor is less than a preset fifth threshold, the controller is configured to determine that the at least one expansion device or the bypass valve malfunctions.

12. The refrigeration cycle apparatus of claim 11,
wherein, in a case where the degree of subcooling at the outlet of the condenser is less than or equal to the preset fourth threshold, and the degree of superheat at the suction port of the compressor is greater than or equal to the preset fifth threshold, the controller is configured to determine that the refrigerant leaks.

13. The refrigeration cycle apparatus of claim 11,
wherein, in a case where the degree of subcooling at the outlet of the condenser is less than or equal to the preset fourth threshold, and the degree of superheat at the suction port of the compressor is less than the preset fifth threshold, and
where a degree of superheat at an outlet of the at least one evaporator is greater than or equal to a preset sixth threshold, the controller is configured to determine that the bypass valve malfunctions.

14. The refrigeration cycle apparatus of claim 11,
wherein, in a case where the degree of subcooling at the outlet of the condenser is less than or equal to the preset fourth threshold, and the degree of superheat at the suction port of the compressor is less than the preset fifth threshold, and
where a degree of superheat at an outlet of the at least one evaporator is less than a preset sixth threshold, the controller is configured to determine that the at least one expansion device malfunctions.

15. The refrigeration cycle apparatus of claim 11,
wherein the at least one expansion device comprises a plurality of expansion devices and the at least one evaporator comprises a plurality of evaporators, the refrigeration cycle apparatus comprising:
an outdoor unit that includes the compressor and the condenser; and
a plurality of indoor units that each include one of the plurality of expansion devices and one of the plurality of evaporators and connected in parallel with each other to the outdoor unit,
wherein, in a case where the degree of subcooling at the outlet of the condenser is less than or equal to the preset fourth threshold, and the degree of superheat at the suction port of the compressor is less than the preset fifth threshold, and
where a degree of superheat at an outlet of the evaporator in each of the plurality of indoor units is greater than or equal to a preset sixth threshold, the controller is configured to determine that the bypass valve malfunctions.

16. The refrigeration cycle apparatus of claim 15,
wherein, in a case where the degree of subcooling at the outlet of the condenser is less than or equal to the preset fourth threshold, and the degree of superheat at the suction port of the compressor is less than the preset fifth threshold, and
where the degree of superheat at the outlet of at least one of the evaporators in the plurality of indoor units is less than the preset sixth threshold, the controller is configured to determine that at least one of the expansion device-devices malfunctions.

* * * * *